US010015266B1

(12) United States Patent
Shavell et al.

(10) Patent No.: US 10,015,266 B1
(45) Date of Patent: Jul. 3, 2018

(54) LIVE MIGRATION OF MASSIVE NUMBERS OF NETWORK CONNECTIONS, INCLUDING LONG LIVED CONNECTIONS

(71) Applicant: Symantec Corporation, Mountain View, CA (US)

(72) Inventors: Michael Shavell, Merrimack, NH (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 875 days.

(21) Appl. No.: 14/493,013

(22) Filed: Sep. 22, 2014

(51) Int. Cl.
*G06F 15/173* (2006.01)
*H04L 29/08* (2006.01)
*H04L 12/803* (2013.01)

(52) U.S. Cl.
CPC .......... *H04L 67/148* (2013.01); *H04L 47/125* (2013.01)

(58) Field of Classification Search
CPC ................ H04L 47/125; H04L 67/148
See application file for complete search history.

(56) References Cited

U.S. PATENT DOCUMENTS

| 8,635,271 | B1* | 1/2014 | Adya | H04L 63/0807 709/203 |
| 2005/0086342 | A1* | 4/2005 | Burt | H04L 41/0663 709/224 |
| 2009/0157882 | A1* | 6/2009 | Kashyap | H04L 69/16 709/227 |
| 2013/0305242 | A1* | 11/2013 | Wang | G06F 9/45558 718/1 |
| 2013/0326175 | A1* | 12/2013 | Tsirkin | G06F 9/45558 711/162 |
| 2015/0178014 | A1* | 6/2015 | Nelson | G06F 3/0647 711/114 |
| 2016/0072713 | A1* | 3/2016 | Mhatre | H04L 47/125 709/235 |

* cited by examiner

*Primary Examiner* — Joseph E Avellino
*Assistant Examiner* — Rachel J Hackenberg
(74) *Attorney, Agent, or Firm* — Patent Law Works LLP (57) ABSTRACT

A massive number of long lived connections is migrated between a source and a destination computer. Connection state information concerning each request being processed on each connection is transferred from the source to the destination computer. The source continues to respond to requests on a given connection while transferring corresponding state information. Once state information for a specific connection has been transferred, the connection is switched from the source to the destination. Connections are kept active during the shifting. While shifting traffic on a specific connection, two versions of the connection can be open simultaneously, one to the source and the other to the destination. Traffic on the connection is routed to the source computer until the shift has been completed, after which the connection on the source computer is closed, and traffic is routed to the destination.

19 Claims, 4 Drawing Sheets

LIVE MIGRATION OF MASSIVE NUMBERS OF NETWORK CONNECTIONS, INCLUDING LONG LIVED CONNECTIONS

TECHNICAL FIELD

This disclosure pertains generally to datacenter management, and more specifically to live migration of massive numbers of network connections, including long lived connections.

BACKGROUND

A contemporary cloud based datacenter can make applications, services and data available to very large numbers of client computers simultaneously. For example, a given node in the datacenter can have millions of concurrent network connections. Clusters are groups of computers that can be deployed in these can other contexts to provide high availability. Clusters use groups of redundant computing resources in order to provide continued service when individual system components fail. Clusters eliminate single points of failure by providing multiple servers, multiple network connections, redundant data storage, etc. Clustering systems are often combined with storage management products that provide additional useful features, such as journaling file systems, logical volume management, etc.

It is also the case that the computing resources utilized by a datacenter change over time as a result of maintenance, decommission and upgrades of existing resources, installation of new resources, etc. In addition, the demand for resources also varies over time based on levels of client and internal activity, which in turn drives needed resource capacity. As the available resources change and levels of desired capacity increase and decrease, load balancing is used to distribute workloads across computing resources such as nodes of the cluster and storage devices. Load balancing attempts to optimize resource use based on factors such avoiding maintenance of overhead capacity, speed, maximization of throughput, etc.

When a single node has a large number of connections (e.g., millions), all of these connections are severed if the node is taken down (for example, because of detected instability, for maintenance or replacement, to address a decrease in demand, etc.). When this occurs, the large number of client computers with severed connections to the node receive connection failure errors, causing them to reissue their requests. This results in the datacenter getting bombarded with requests, and creates a major overhead often resulting in over-allocation of resources to address the rapid re-connect scenario. It also creates a latency for the clients as they try to get responses to their requests, which leads to a degraded experience for the end users of the client computers. This problem affects all network connection types, but is particularly acute for types of connections that are kept open between computers for a longer period of time (known as "long lived connections") such as long poll, Hypertext Transfer Protocol ("HTTP") streaming, and HTTP pipelining connections.

It would be desirable to address these issues.

SUMMARY

Large numbers (e.g., a million or more) connections are migrated between a source computer and one or more destination computers in a computer network, such as a cluster or datacenter. The source and destination computers can be in the form of servers in a datacenter which provides services and the like to endpoint computers (e.g., remotely located clients). The connections between a source computer and multiple endpoints that are migrated to one or more destination computers can be in the form of long lived connections, such as long poll, HTTP streaming and/or HTTP pipelining connections. The connections are maintained during the migration without stopping traffic between the network (e.g., the source and destination computers) and the endpoint computers.

Multiple connections between multiple endpoint computers and a specific source computer in the network are migrated from the source computer to one or more destination computers in the network. The migration can be initiated, for example, in response to the source computer receiving a corresponding control signal from the network load balancer. In another embodiment, the migration is initiated automatically by the source computer, for example in response to the results of self-diagnostics, or according to a pre-determined schedule. In another embodiment, the migration is initiated in response to an indication input by a human (e.g., entered by an administrator operating a GUI).

Connection state information concerning each request from each one of the multiple endpoint computers being processed on each one of the multiple connections is transferred from the specific source computer to the destination computer, in response to the initiating of the migration. The source computer continues to respond to requests received on a specific connection while transferring corresponding connection state information to the specific destination computer. Once connection state information for a specific connection has been transferred to the destination computer, the destination computer is notified that it is now responsible for the specific connection, and the load balancer is notified to switch the specific connection from the source computer to the destination computer. In one embodiment, these notifications are performed separately for each specific connection, subsequently to transferring the corresponding connection state information to the destination computer. In other embodiments, the notifications are made in batch mode for a plurality of specific connections, after the corresponding connection state information for each of the connections has been transferred.

The traffic to and from the multiple endpoint computers on the multiple connections is shifted from the source computer to the destination computer, while the multiple connections are kept active during the shifting. In other words, the traffic between the multiple endpoint computers and the network (e.g., datacenter) does not stop during the migration of the multiple connections from the source computer to the destination computer. While shifting traffic on a specific connection from the source to the destination computer, two open versions of the specific connection can be maintained simultaneously, one to the source computer and the other to the destination computer. Traffic on the specific connection can be linked to both the source and destination computer during the shifting process. The load balancer can monitor for traffic on the connection during this time, and route the monitored traffic to the source computer until the shift has been completed. The completion of the shift to the destination computer can be performed while the specific connection is in a quiet wait state. After having completed the shifting of a specific connection from the source computer to the destination computer, the connection can be closed on the source computer, and the traffic routed to the destination computer on its open connection.

In some embodiments, the connections are migrated from a single source computer to multiple destination computers. The destination computer(s) to which to migrate connections can be determined based on factors such as availability, available network bandwidth, available processing capacity, available storage and proximity to endpoint computers. In some embodiments, connections are simultaneously migrated from multiple source computers to one or more destination computers.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
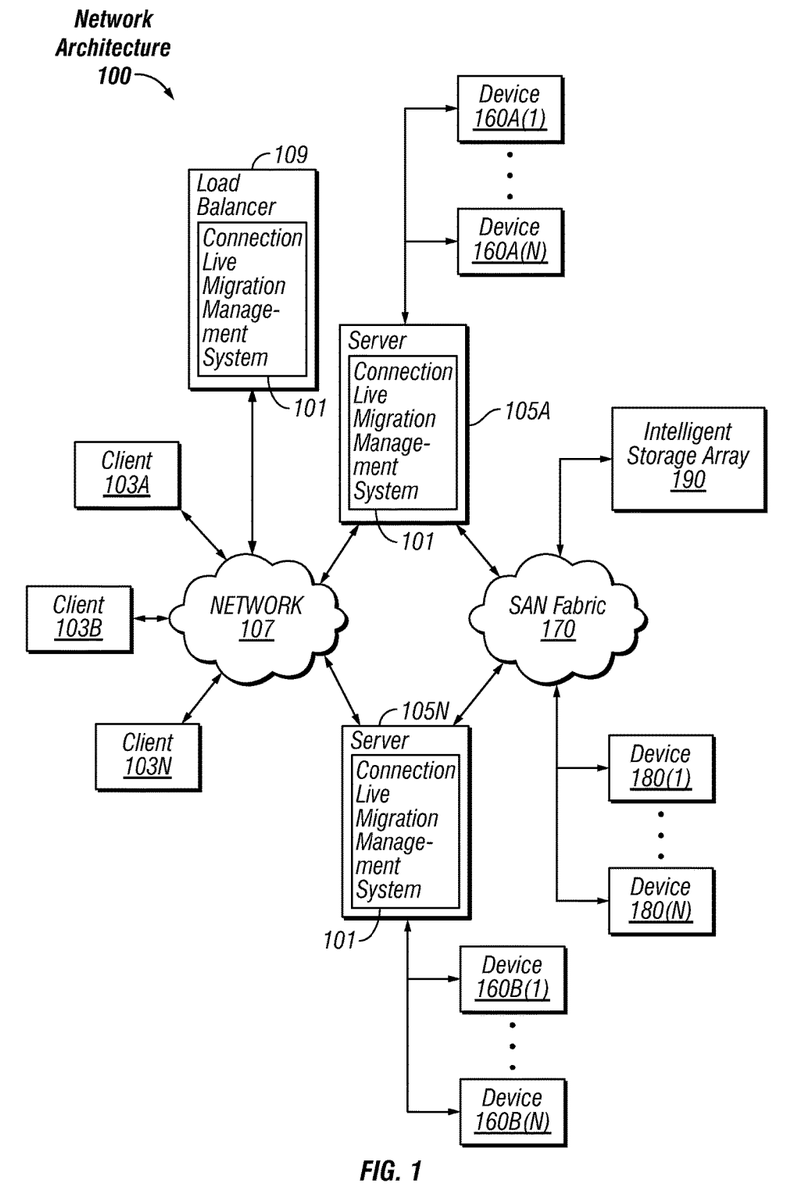
FIG. 1 is a block diagram of an exemplary network architecture in which a connection live migration management system can be implemented, according to some embodiments.

FIG. 1 is a block diagram illustrating an exemplary network architecture 100 in which a connection live migration management system 101 can be implemented. In the illustrated network architecture 100, client systems 103A, 103B and 103N, as well as servers 105A and 105N, are communicatively coupled to a network 107. It is to be understood that in practice orders of magnitude more clients 103 and servers 105 can be deployed. A load balancer 109 performs load balancing functions as described in more detail below. A connection live migration management system 101 is illustrated as residing on the load balancer 109, and on each server (105A and 105N), but it is to be understood that in different embodiments the connection live migration management system 101 can reside on different computers 210, or be distributed between multiple computing systems 210 in different ways as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or handheld or wearable mobile computing devices, comprising portable computer systems capable of connecting to a network 107 and running applications.

Although FIG. 1 illustrates three clients 103A-N and two servers 105A-N as an example, in practice many more (or fewer) computers can be deployed as noted above. In one embodiment, the network 107 is in the form of the internet. Other networks 107 or network-based environments can be used in other embodiments.

Figure 2:
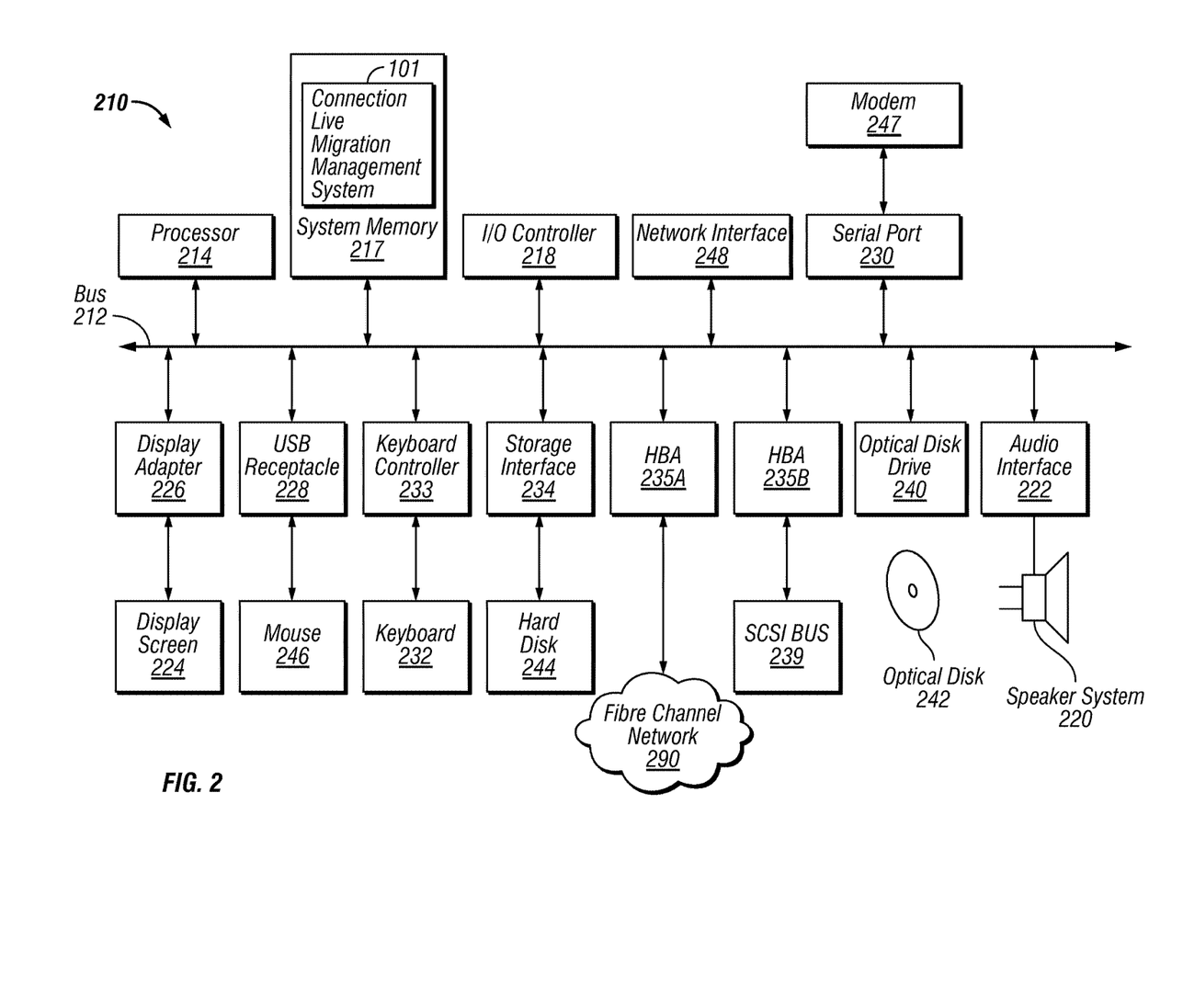
FIG. 2 is a block diagram of a computer system suitable for implementing a connection live migration management system, according to some embodiments.

FIG. 2 is a block diagram of a computer system 210 suitable for implementing a connection live migration management system 101. Clients 103, servers 105 and load balancers 109 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the connection live migration management system 101 is illustrated as residing in system memory 217. The workings of the connection live migration management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
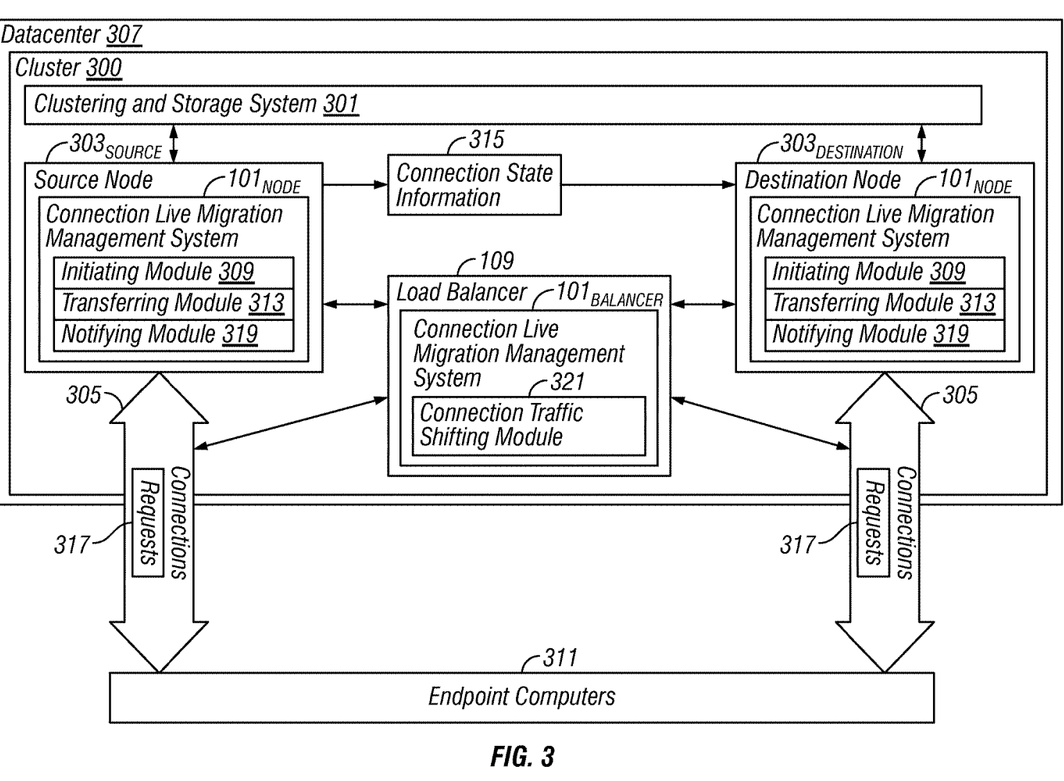
FIG. 3 is a high level block diagram of the operation of a connection live migration management system, according to some embodiments.

FIG. 3 illustrates a component of the connection live migration management system $101_{BALANCER}$ running on a load balancer 109 in a cluster 300. In FIG. 3, the load balancer 109 is illustrated as a single entity. In practice, the load balancer 109 can be implemented as a dedicated hardware device, or as a component residing on one or more computing devices 210. For example, in one embodiment the load balancer 109 is in the form of a dedicated computing device 210 programmed to perform specific load balancing functionalities, whereas in other embodiments the load balancer 109 is instantiated as a component of another system, for example the clustering and storage system 301 described below.

FIG. 3 also illustrates a component of the connection live migration management system $101_{NODE}$ running on each of two nodes 303 in the cluster 300. As described above, the functionalities of the connection live migration management system 101 can reside on specific computers 210 (e.g., load balancer 109, servers 105) or be otherwise distributed between multiple computer systems 210, including within a fabric/cloud-based computing environment in which the functionality of the connection live migration management system 101 is provided as a service over a network 107. It is to be understood that although the connection live migration management system 101 is illustrated in FIG. 3 as a single entity, the illustrated connection live migration management system 101 represents a collection of functionalities, which can be instantiated as a single or multiple modules as desired (instantiation of a specific, multiple module connection live migration management system 101 is illustrated in FIG. 3). It is to be understood that the modules of the connection live migration management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the connection live migration management system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

FIG. 3 illustrates a cluster 300 instantiated in the context of a clustering and storage system 301. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. In FIG. 3, the illustrated cluster 300 depicts two nodes 303 (node 303A and node 303N). It is to be understood that in other embodiments, a cluster 300 can have more nodes 303, including orders of magnitude more. The cluster illustrated in FIG. 3 is maintained in the context of a datacenter 307, but in other embodiments the connection live migration management system 101 can be implemented in network 107 contexts other than clusters 300 and/or datacenters 307.

As described in more detail below, the connection live migration management system 101 enables large numbers (e.g., millions) of connections 305 to be migrated from one node 303 to another, providing a live switch of the connections 305. The process is transparent from the point of view of the endpoint computers 311 (e.g., the clients 103 which are having their connections 305 migrated between nodes 303), and allows each connection 305 to remain active as the move between nodes 303 is occurring. In other words, the traffic between the endpoint computers 311 and the cluster 300 does not stop during the migration of the connections 305 between nodes 303. Thus, millions of concurrent connections 305 to endpoint computers 311 are gracefully migrated between cluster nodes 303. Datacenters 307 often provide many services that keep connections 303 open for long periods of time (e.g., provide long lived connections $305_{LONG}$). By enabling live migration of massive numbers of long lived connections $305_{LONG}$, the connection live migration management system 101 enables major optimizations during the addition, removal or maintenance of nodes 303, as well as when traffic is moved between datacenters 307. The connection live migration management system 101 thus greatly improves the performance and operation of the nodes 303, the load balancer 109 and the cluster 300 or other network 107 environment.

In this discussion of migrating connections 305 between nodes 303, the node 303 from which the connections 305 are moved is referred to as the "source node" $303_{SOURCE}$, and the node 303 to which the connections 305 are moved is referred to as the "destination node" $303_{DESTINATION}$. Although FIG. 3 illustrates a single destination node $303_{DESTINATION}$, it is to be understood that in some embodiments the connections 305 being migrated from a single source node $303_{SOURCE}$ can be distributed between multiple destination nodes $303_{DESTINATION}$ as discussed in greater detail below. Furthermore, connections 305 can be migrated from multiple source nodes $303_{SOURCE}$ simultaneously.

An initiating module 309 of the connection live migration management system $101_{NODE}$ on the source node $303_{SOURCE}$ initiates the migration process. This initiation can occur under a variety of circumstances. For example, the initiating module 309 can initiate the migration process in response to receiving an indication from a human such as an administrator (not illustrated) (e.g., the administrator can input the indication to begin the process by operating a GUI or other type of user interface). An administrator 311 can indicate to move the connections 305 off of a particular source node $303_{SOURCE}$ in order to take the node $303_{SOURCE}$ down for maintenance or testing, remove the node $303_{SOURCE}$ from the cluster 300, etc. In other embodiments, the initiating module 309 initiates the migration process automatically at a source node $303_{SOURCE}$ level, for example in response to the source node $303_{SOURCE}$ detecting its own instability (e.g., by running self-diagnostics) or according to a pre-determined schedule (e.g., for maintenance, an upgrade, etc.). In yet other embodiments, the initiating module 309 on the source node $303_{SOURCE}$ initiates the migration process in response to receiving a control signal or other type of indication from the load balancer 109. The load balancer 109 can determine that connections 305 are to be migrated from the source node $303_{SOURCE}$ for load balancing reasons, such as to eliminate excess datacenter 307 capacity by taking the source node $303_{SOURCE}$ offline in response to a decrease in demand.

To facilitate the migration of the connections 305, a transferring module 313 of the connection live migration management system $101_{NODE}$ on the source node $303_{SOURCE}$ transfers connection state information 315 concerning each request 317 from each endpoint 311 being processed on each connection 305 to the destination node $303_{DESTINATION}$ to which the connection is being transferred. As noted above, the connections 305 can be transferred to a single destination node $303_{DESTINATION}$, or can distributed among multiple destination nodes $303_{DESTINATION}$ as desired. The process by which destination node(s) $303_{DESTINATION}$ are selected is described in more detail below. Note that the source node $303_{SOURCE}$ has a large number of connections 305 open, and is servicing requests 317 from endpoint computers 311 (e.g., clients 103) on these connections 305. For this reason, the source node $303_{SOURCE}$ transfers data about each request 317 (i.e., the connection state information) to the corresponding destination node $303_{DESTINATION}$, while continuing to respond to requests 317. As described below, once the load balancer 109 is informed of and has processed the migration of a connection 305 off the source node $303_{SOURCE}$, new requests 317 on that connection 305 are no longer sent to the source node $303_{SOURCE}$. However, the source node $303_{SOURCE}$ has a lot of connections 305 to migrate, so many requests 317 are typically in process at the time the migration is initiated.

Once the connection state information 315 for a given connection has been transferred to a destination node $303_{DESTINATION}$, the source node $303_{SOURCE}$ can stop responding to requests 317 on that connection 305. A notifying module 319 of the connection live migration management system $101_{NODE}$ on the source node $303_{SOURCE}$ notifies the destination node $303_{DESTINATION}$ that it is now the active node for that connection 305 (i.e., the destination node $303_{DESTINATION}$ is now responsible for servicing the connection 305), and notifies the load balancer 109 that the connection 305 is ready for switch from the source node $303_{SOURCE}$ to the destination node $303_{DESTINATION}$. The stopping and notification steps can be performed separately for each specific connection 305 as corresponding connection state information 315 is transferred, or can be done in batch match once the connection state information 315 for all (or a specific subset/group) of the connections 305 has been transferred. In either case, the connection live migration management system $101_{NODE}$ on the destination node(s) $303_{DESTINATION}$ receives an indication that the destination node $303_{DESTINATION}$ is now active for the given connection(s) 305, and the connection live migration management system $101_{BALANCER}$ on the load balancer 109 receives notification of all of the active connections 305 that are ready for migration and the specific destination node(s) $303_{DESTINATION}$ to which the connections 305 should be moved.

A connection traffic shifting module 321 of the connection live migration management system $101_{BALANCER}$ on the load balancer 109 shifts connection traffic from the source node $303_{SOURCE}$ to the destination node(s) $303_{DESTINATION}$. More specifically, the connection traffic shifting module 321 winds down the routing of requests 317 to the source node $303_{SOURCE}$, and spins up the routing of requests 317 to the destination node(s) $303_{DESTINATION}$ on the migrated connections 305. While migrating traffic on a given connection 305, the connection traffic shifting module 321 can have two connections 305 open simultaneously, one to the source node $303_{SOURCE}$ and the other to the corresponding destination node $303_{DESTINATION}$. Thus during the switch over, traffic on a given connection 305 can be linked to both the source node $303_{SOURCE}$ and corresponding destination node $303_{DESTINATION}$, with the connection traffic shifting module 321 monitoring for traffic on the connection 305, and routing it to the source node $303_{SOURCE}$ until the shift has been completed. The actual shift of the connection 305 to the destination node $303_{DESTINATION}$ can be made when the connection 305 has gone into a quiet wait state. Once the shift has been made, the connection on the source node $303_{SOURCE}$ is closed and traffic is routed to the corresponding destination node $303_{DESTINATION}$, all of which is completely transparent to the endpoints 311. It is to be understood that the connection live migration management system $101_{BALANCER}$ on the load balancer 109 can determine which (and how many) destination node(s) $303_{DESTINATION}$ is/are to take over the migrated connections 305 from a given source node 303, based on factors such as availability of the destination nodes $303_{DESTINATION}$, available bandwidth, processing capability, storage capacity or other computational resources on the destination node(s) $303_{DESTINATION}$, proximity of the destination node(s) $303_{DESTINATION}$ to the endpoint computers 311, etc.

By enabling graceful migration of massive numbers of long lived connections $305_{LONG}$ between nodes 305 in a manner that is transparent to the endpoint computers 311, the connection live migration management system 101 enables cloud based datacenters 307 to be dynamically scaled up and down as desired, without delayed response times. It is to be understood that although this scenario is one specific use case, the connection live migration management system 101 is by no means limited to being deployed on the cloud, in datacenters 307 or within the context of a cluster 300, nor is the connection live migration management system 101 limited to migrating long lived connections $305_{LONG}$. Instead, the connection live migration management system 101 can be used to migrate any type of connection 305 between any type of computing device 210 in any type of network 107.

Figure 4:
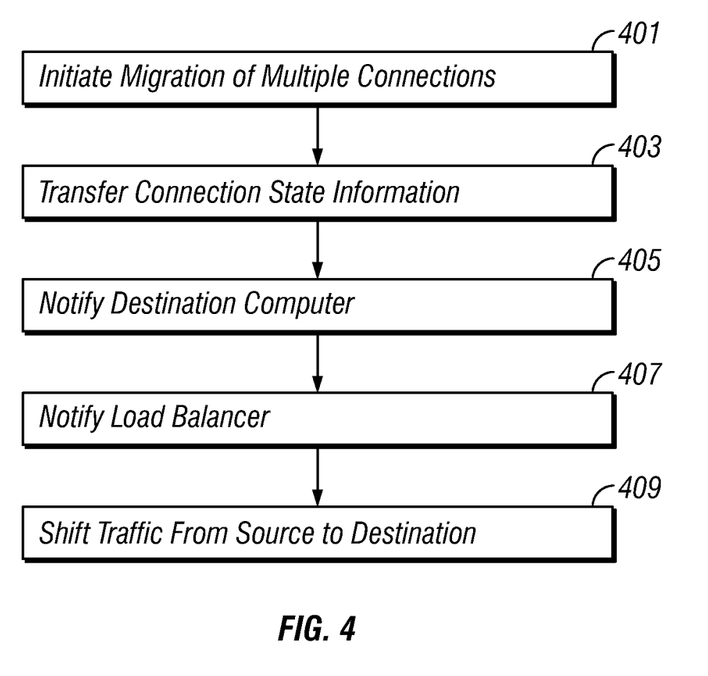
FIG. 4 is a flow chart of the steps an exemplary method of the operation of a connection live migration management, according to some embodiments.

FIG. 4 illustrates steps of the operation of a live migration management system 101, according to some embodiments. The initiating module 309 initiates 401 the migration of multiple connections 305 from a specific source node $303_{SOURCE}$ in the network 107 to a specific destination node $303_{DESTINATION}$ in the network 107. The transferring module 313 transfers 403 connection state information 315 concerning each request 317 from each one of multiple endpoint computers 311 being processed on each one of the multiple connections 305, from the specific source node $303_{SOURCE}$ to the specific destination node $303_{DESTINATION}$. The notifying module 319 notifies 405 the specific destination node $303_{DESTINATION}$ that it is now responsible for the specific connection 305, and notifies 407 the load balancer 109 to switch the specific connection 305 from the source node $303_{SOURCE}$ to the destination node $303_{DESTINATION}$. The connection traffic shifting module 321 shifts 409 traffic from the specific source node $303_{SOURCE}$ to the specific destination node $303_{DESTINATION}$, while keeping the multiple connections 305 active during the shifting, such that the traffic does not stop during the migration of the multiple connections 305 from the specific source node $303_{SOURCE}$ to the specific destination node $303_{DESTINATION}$.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for migrating multiple network connections in a computer network comprising at least one source computing device, at least one destination computing device and a load balancer, wherein the network connections are initially between a source computing device in the computer network and multiple endpoint computing devices, and after being migrated are between at least one destination computing device in the computer network and the multiple endpoint computing devices, wherein the multiple connections are maintained during the migration without stopping traffic between the computer network and the multiple endpoint computing devices, the method comprising the steps of:
    initiating migration of multiple network connections between multiple endpoint computing devices and a specific source computing device in the computer network, from the specific source computing device to a specific destination computing device in the computer network;
    transferring, from the specific source computing device to the specific destination computing device, connection state information concerning each request from each one of the multiple endpoint computing devices being processed on each one of the multiple network connections, in response to the initiating of the migration;
    subsequently to transferring connection state information for a specific network connection to the specific destination computing device, notifying the specific destination computing device that it is now responsible for the specific network connection and notifying the load balancer to switch the specific network connection from the source computing device to the destination computing device; and
    shifting traffic to and from the multiple endpoint computing devices on the multiple network connections from the specific source computing device to the specific destination computing device, while keeping the multiple network connections active during the shifting, wherein the traffic between the multiple endpoint computing devices and the computer network does not stop during the migration of the multiple network connections from the specific source computing device to the specific destination computing device, the shifting further comprising:
        while shifting traffic on the specific network connection from the specific source computing device to the specific destination computing device, maintaining two open versions of the specific network connection simultaneously, one to the specific source computing device and the other to the specific destination computing device; and
        simultaneously, winding down routing of requests to the specific source computing device and spinning up routing of requests to the specific destination computing device via the two open versions of the specific network connection.

2. The method of claim 1 wherein initiating migration of multiple network connections between multiple endpoint computing devices and a specific source computing device in the network, from the specific source computing device to a specific destination computing device in the computer network further comprises:
    receiving a control signal, by the specific source computing device from the load balancer, the control signal indicating to initiate the migration of the multiple network connections from the specific source computing device to the specific destination computing device; and
    initiating the migration of the multiple network connections in response to receiving the control signal from the load balancer, by the specific source computing device.

3. The method of claim 1 wherein initiating migration of multiple network connections between multiple endpoint computing devices and a specific source computing device in the computer network, from the specific source computing device to a specific destination computing device in the computer network further comprises:
    initiating the migration of the multiple network connections by the specific source computing device automatically, in response to results of self-diagnostics.

4. The method of claim 1 wherein initiating migration of multiple network connections between multiple endpoint computing devices and a specific source computing device in the computer network, from the specific source computing device to a specific destination computing device in the network further comprises:
    initiating the migration of the multiple network connections by the specific source computing device automatically, according to a pre-determined schedule.

5. The method of claim 1 wherein initiating migration of multiple network connections between multiple endpoint computing devices and a specific source computing device in the computer network, from the specific source computing device to a specific destination computing device in the network further comprises:

receiving, by the specific source computing device, a human input indication to initiate the migration of the multiple network connections from the specific source computing device to the specific destination computing device; and initiating the migration of the multiple network connections in response to receiving the human input indication, by the specific source computing device.

6. The method of claim 1 wherein transferring, from the specific source computing device to the specific destination computing device, connection state information concerning each request from each one of the multiple endpoint computing devices being processed on each one of the multiple network connections further comprises:

continuing to respond to requests received on a specific network connection, by the specific source computing device, while transferring connection state information concerning requests received on the specific network connection to the specific destination computing device.

7. The method of claim 1 wherein notifying the specific destination computing device that it is now responsible for the specific network connection and notifying the load balancer to switch the specific network connection from the source computing device to the destination computing device further comprises:

performing the notifying steps separately for each specific network connection, subsequently to transferring connection state information for the specific network connection to the specific destination computing device.

8. The method of claim 1 wherein notifying the specific destination computing device that it is now responsible for the specific network connection and notifying the load balancer to switch the specific network connection from the source computing device to the destination computing device further comprises:

performing the notifying steps in batch mode for a plurality of specific network connections, subsequently to transferring connection state information for the plurality of specific network connections to the specific destination computing device.

9. The method of claim 1 wherein shifting traffic to and from the multiple endpoint computing devices on the multiple network connections from the specific source computing device to the specific destination computing device, while keeping the multiple network connections active during the shifting further comprises:

while shifting traffic on a specific network connection from the specific source computing device to the specific destination computing device, linking traffic on the specific network connection to both the specific source computing device and to the specific destination computing device;

monitoring for traffic on the specific network connection, and routing the monitored traffic to the specific source computing device until the shift has been completed;

completing the shift of traffic to the specific destination computing device while the specific network connection is in a wait state.

10. The method of claim 1 wherein shifting traffic to and from the multiple endpoint computing devices on the multiple network connections from the specific source computing device to the specific destination computing device, while keeping the multiple network connections active during the shifting further comprises:

subsequently to having completed shifting a specific network connection from the specific source computing device to the specific destination computing device, closing the specific network connection on the specific source computing device and routing traffic on the specific connection to the specific destination computing device.

11. The method of claim 1 further comprising:

migrating multiple network connections from the specific source computing device to a plurality of destination computing devices.

12. The method of claim 1 further comprising:

determining at least one specific destination computing device to which to migrate multiple network connections from the specific source computing device, based on at least one factor from a group of factors consisting of: availability of the at least one specific destination computing device, available network bandwidth of the at least one specific destination computing device, available processing capacity of the at least one specific destination computing device, available storage on the at least one specific destination computing device and proximity of the at least one specific destination computing device to at least one endpoint computing device.

13. The method of claim 1 further comprising:

simultaneously migrating multiple network connections from multiple source computing devices to at least one destination computing device.

14. The method of claim 1 wherein:

the computer network further comprises a datacenter from which computational services are made available, the at least one source computing device and the at least one destination computing device comprise servers in the datacenter, and the multiple endpoint computing devices comprise clients which access the servers.

15. The method of claim 1 wherein:

at least some of the multiple migrated network connections comprise long lived connections.

16. The method of claim 1 wherein:

at least some of the multiple migrated network connections consist of at least one of the following connection types: a long poll connection, a Hypertext Transfer Protocol ("HTTP") streaming connection and an HTTP pipelining connection.

17. The method of claim 1 wherein:

the multiple migrated network connections comprise at least one million connections.

18. At least one non-transitory computer readable medium for migrating multiple network connections in a computer network comprising at least one source computing device, at least one destination computing device and a load balancer, wherein the network connections are initially between a source computing device in the computer network and multiple endpoint computing devices, and after being migrated are between at least one destination computing device in the computer network and the multiple endpoint computing devices, wherein the multiple network connections are maintained during the migration without stopping traffic between the computer network and the multiple endpoint computing devices, the at least one non-transitory computer readable medium storing computer executable instructions that, when loaded into computer memory and executed by at least one processor of at least one computing device, cause the at least one computing device to perform the following steps:

initiating migration of multiple connections between multiple endpoint computing devices and a specific source computing device in the computer network, from the specific source computing device to a specific destination computing device in the computer network;

transferring, from the specific source computing device to the specific destination computing device, connection state information concerning each request from each one of the multiple endpoint computing devices being processed on each one of the multiple network connections, in response to the initiating of the migration;

subsequently to transferring connection state information for a specific network connection to the specific destination computing device, notifying the specific destination computing device that it is now responsible for the specific network connection, notifying the load balancer to switch the specific network connection from the source computing device to the destination computing device; and shifting traffic to and from the multiple endpoint computing devices on the multiple network connections from the specific source computing device to the specific destination computing device, while keeping the multiple network connections active during the shifting, wherein the traffic between the multiple endpoint computing devices and the computer network does not stop during the migration of the multiple network connections from the specific source computing device to the specific destination computing device, the shifting further comprising:

while shifting traffic on the specific network connection from the specific source computing device to the specific destination computing device, maintaining two open versions of the specific network connection simultaneously, one to the specific source computing device and the other to the specific destination computing device; and simultaneously, winding down routing of requests to the specific source computing device and spinning up routing of requests to the specific destination computing device via the two open versions of the specific network connection.

19. A computer system for migrating multiple network connections in a computer network comprising at least one source computing device, at least one destination computing device and a load balancer, wherein the connections are initially between a source computing device in the network and multiple endpoint computing devices, and after being migrated are between at least one destination computing device in the computer network and the multiple endpoint computing devices, wherein the multiple network connections are maintained during the migration without stopping traffic between the computer network and the multiple endpoint computing devices, the computer system comprising:

a processor;

system memory;

an initiating module residing in the system memory, the initiating module being programmed to initiate migration of multiple network connections between multiple endpoint computing devices and a specific source computing device in the computer network from the specific source computing device to a specific destination computing device in the computer network;

a transferring module residing in the system memory, the transferring module being programmed to transfer, from the specific source computing device to the specific destination computing device, connection state information concerning each request from each one of the multiple endpoint computing devices being processed on each one of the multiple network connections, in response to the initiating of the migration;

a notifying module residing in the system memory, the notifying module being programmed to notify the specific destination computing device subsequently to transferring connection state information for a specific network connection, that it is now responsible for the specific network connection and to notify the load balancer to switch the specific network connection from the source computing device to the destination computer, subsequently to transferring connection state information for a specific network connection to the specific destination computing device; and a connection traffic shifting module residing in the system memory, the connection traffic shifting module being programmed to shift traffic to and from the multiple endpoint computing devices on the multiple network connections from the specific source computing device to the specific destination computing device, while keeping the multiple connections active during the shifting, wherein the traffic between the multiple endpoint computing devices and the computer network does not stop during the migration of the multiple network connections from the specific source computing device to the specific destination computing device, wherein to shift traffic further comprises:

while shifting traffic on the specific network connection from the specific source computing device to the specific destination computing device, maintaining two open versions of the specific network connection simultaneously, one to the specific source computing device and the other to the specific destination computing device; and simultaneously, winding down routing of requests to the specific source computing device and spinning up routing of requests to the specific destination computing device via the two open versions of the specific network connection.

* * * * *